United States Patent
Yamazaki

(10) Patent No.: US 7,210,358 B2
(45) Date of Patent: May 1, 2007

(54) FORCE SENSOR ASSEMBLY

(75) Inventor: Tatsuya Yamazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 139 days.

(21) Appl. No.: 11/173,406

(22) Filed: Jul. 1, 2005

(65) Prior Publication Data
US 2006/0010984 A1   Jan. 19, 2006

(30) Foreign Application Priority Data
Jul. 15, 2004   (JP) ............................. 2004-208009
Jul. 15, 2004   (JP) ............................. 2004-208010

(51) Int. Cl.
*F16B 31/02* (2006.01)
(52) U.S. Cl. .................... 73/761; 73/749; 73/768; 73/782; 73/795; 73/812; 73/849; 73/862.381; 73/862.391; 73/862.451; 73/862.471
(58) Field of Classification Search .................. 73/749, 73/761, 768, 795, 812, 849, 862.381, 86.391, 73/862.451, 862.471
See application file for complete search history.

(56) References Cited

U.S. PATENT DOCUMENTS

| | | | |
|---|---|---|---|
| 6,349,602 B1 * | 2/2002 | Hamada et al. ................ 73/782 |
| 6,356,200 B1 * | 3/2002 | Hamada et al. ............. 340/667 |
| 6,397,688 B1 * | 6/2002 | Sakamoto et al. ...... 73/862.637 |
| 6,640,653 B1 * | 11/2003 | Ishida .................... 73/862.627 |
| 6,677,539 B2 * | 1/2004 | Miura et al. ................. 177/136 |
| 6,952,975 B2 * | 10/2005 | Nishio et al. .......... 73/862.451 |
| 7,047,825 B2 * | 5/2006 | Curtis et al. ............ 73/862.391 |
| 2002/0033283 A1 * | 3/2002 | Miura et al. ................. 177/229 |
| 2006/0048582 A1 * | 3/2006 | Furukawa et al. ............. 73/856 |
| 2007/0001832 A1 * | 1/2007 | Furukawa et al. .......... 340/457 |

FOREIGN PATENT DOCUMENTS

| | | |
|---|---|---|
| JP | 08-005475 | 1/1996 |
| JP | 2000-203324 | 7/2000 |

\* cited by examiner

*Primary Examiner*—Edward Lefkowitz
*Assistant Examiner*—Freddie Kirkland, III
(74) *Attorney, Agent, or Firm*—Rankin, Hill, Porter & Clark LLP

(57) ABSTRACT

A force sensor assembly includes a force sensor, a first support member, a threaded portion, an opening made in the first support member, a nut, a restricting member and a spacer. The nut is screwed onto the threaded portion which is inserted through the opening. The restricting member is provided between the force sensor and the nut. The spacer, which is provided between the force sensor and the nut, is deformable in a direction of its thickness. The shape of the spacer is adapted to avoid interference with the restricting member. Before the nut is tightened onto the threaded portion, a summation of thickness for the first support member and the spacer is adapted to be not less than a height of the restricting member. The nut is tightened up with a predetermined fastening torque until the spacer deforms so that the nut strikes the restricting member.

13 Claims, 13 Drawing Sheets

FORCE SENSOR ASSEMBLY

BACKGROUND OF THE INVENTION

The present invention relates to a force sensor assembly, and more particularly relates to a force sensor assembly, which is able to provide accurate measurement of a force.

An air bag system is mounted on a vehicle so as to provide safety for a passenger in case of a collision. A sensor is installed in a side seat in order to control the air bag system. A force sensor is typically selected for this sensor, which is able to measure the weight of a passenger when he is seated on the seat. This force sensor, which detects a seated passenger, generates a signal for controlling inflation of the air bag system. The control includes a case where a system prevents an air bag from inflating if the system determines that a passenger is a child, and another case where a system adjusts speed of inflation of an air bag according to the weight of a passenger, for example.

Patent document 1 discloses a technique associated with a force sensor assembly. This technique employs an upper rail, on which a seat cushion frame is disposed, is slidably supported on a seat track. The seat frame and upper rail have respective through holes, which are aligned with each other. A nut is tightened onto a threaded portion of the force sensor, which is inserted through the through holes. When a passenger is seated on a seat, the seat cushion frame pivots relative to the upper rail, increasing a distance between the seat cushion frame and the upper rail. This produces a tensile force acting on the threaded portion. In this way, the force sensor detects the force. The technique described above, which requires a mechanism that allows the seat cushion frame to pivot relative to the upper rail, inevitably renders the assembly complex.

Accordingly, it may be preferable in terms of simplification to place another type of sensor, which senses a compressive force acting downward instead, between a seat cushion frame and an upper rail, as disclosed in patent document 2.

Patent document 1: 2000-203324 (paragraphs 0024, 0029, FIG. 3)

Patent document 2: U.S. Pat. No. 3,268,128 (08-005475) (paragraphs 0013 to 0017, FIG. 1)

However, because the force sensor assembly disclosed in the patent document 2 requires that tightening of a nut onto the threaded portion does not have an adverse effect on the force sensor, it will be necessary to introduce more complex operation for tightening the nut. If an excessive torque is imposed on the nut, for example, it will affect adversely the force sensor to provide less accuracy due to a tensile stress axially acting on the threaded portion. In addition, because an origin of the force sensor is shifted, an available range for detecting a force will be narrowed, which leads to difficulty in implementing highly accurate detection.

There is also another problem that decreases accuracy for detection. It may be that the excessive torque induces torsion about an axis of the force sensor.

On the other hand, when tightening is carried out paying attention to an effect on the force sensor, it may possibly occur that the torque falls short to create looseness between the seat cushion frame and the upper rail, which is a cause for incomplete fastening.

A force sensor assembly disclosed in the patent document 1, which is secured to a seat frame and a sliding frame, tends to suffer preload when it is mounted. There are several causes for this preload, such as an error in parallelism of the sliding frame, variation in dimensions for a sensor mounting area of the seat frame which is created during its fabrication and a displacement of mounting position of a seat onto a vehicle body. In this case, distortion caused by the preload in the force sensor may add up to a false detection including the distortion in addition to the true weight of a passenger, or may create a measurement error due to deterioration of accuracy of the force sensor.

SUMMARY OF THE INVENTION

Taking into account drawbacks associated with the conventional technique, the present invention seeks to provide a force sensor assembly which is able to prevent a decrease in accuracy of force measurement due to a displacement and an error which may occur while a force sensor is mounted.

It is an aspect of the present invention to provide a force sensor assembly, which comprises a force sensor, a first support member, a threaded portion provided for the force sensor, an opening made in the first support member, a nut, a restricting member and a spacer. The nut is screwed onto the threaded portion which is inserted through the opening. The restricting member is provided between the force sensor and the nut. The spacer, which is provided between the force sensor and the nut, is deformable in a direction of its thickness. The shape of the spacer is adapted to avoid interference with the restricting member. Before the nut is tightened onto the threaded portion, a summation of thickness for the first support member and the spacer is adapted to be not less than a height of the restricting member. The nut is tightened up with a predetermined fastening torque until the spacer deforms so that the nut strikes the restricting member.

When the nut and spacer are tightened onto the threaded portion with the predetermined fastening torque, the spacer deforms in its thickness direction. When the nut has struck the restricting member to cease rotation, the spacer does not deform any more. Because it is possible to provide stable control for fastening the nut, the nut will not be excessively tightened onto the threaded portion. As a result, it is possible to increase detection accuracy, because chances that axial and radial forces excessively act on the force sensor are eliminated. Furthermore, because it is possible to exert relatively high torque on the nut, the force sensor can be securely attached to the first support member.

It is another aspect of the present invention to provide a force sensor assembly, which further comprises a second support member, a bracket, fasteners and a sliding member. The fasteners are used for attaching the force sensor to the second support member through the bracket. The bracket is able to slide on the second support member and the sliding member is interposed between the second support member and the bracket.

The invention described above provides an easier movement of the force sensor when its adjustment of location is carried out, thereby allowing an easier positioning of the force sensor.

Furthermore, the present invention is able to prevent a decrease in accuracy for force measurement, which is caused by a displacement and error while the force sensor is mounted.

DESCRIPTION OF THE PREFERRED EMBODIMENTS

Embodiments of the present invention are now described with reference to the accompanying drawings. In the description hereinafter, directions of a force sensor are defined in the following way, although the force sensor has no preference in terms of mounting directions. "Forward" and "backward" are comparable to front and rear sides relative to a direction of vehicular traveling, respectively. "Upward" and "downward" are meant to represent vertical directions opposite to each other.

a. First Embodiment

Figure 2:
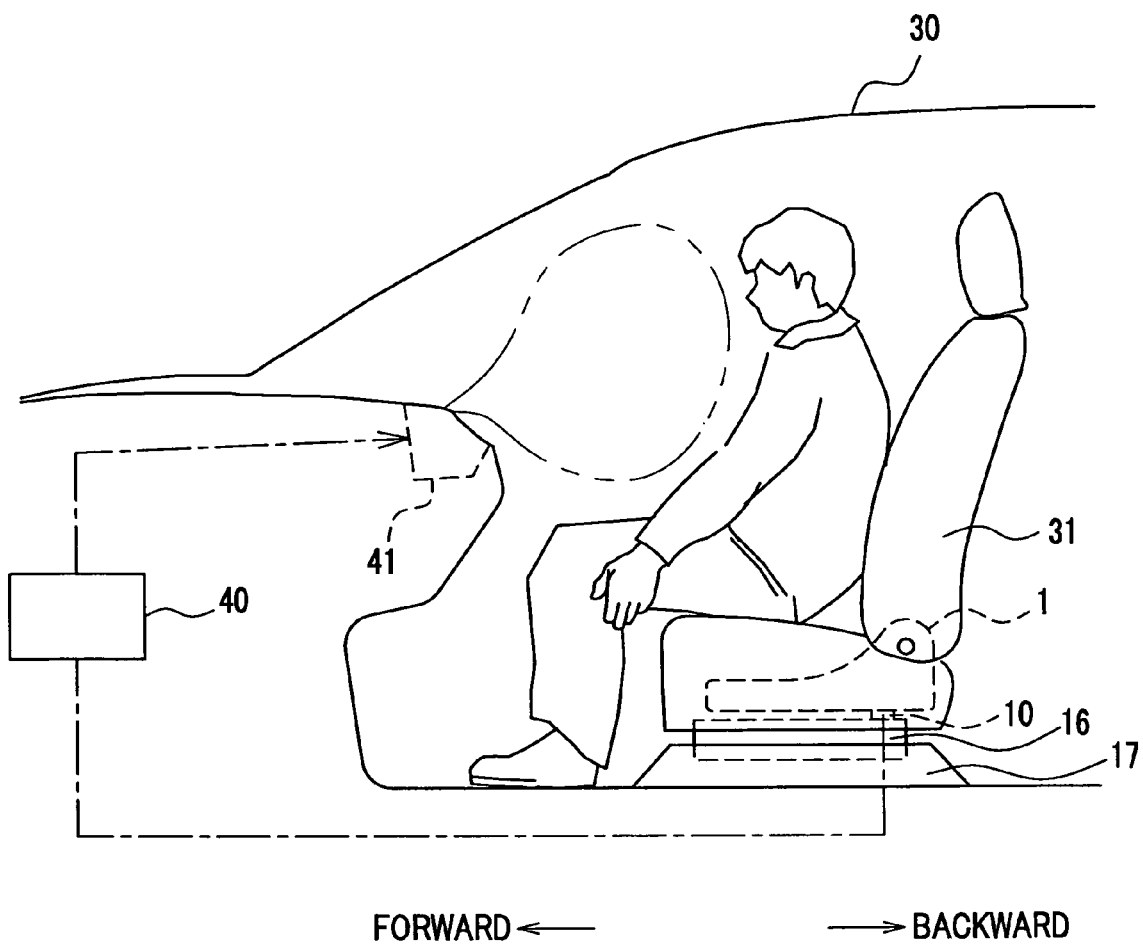
FIG. 2 is a schematic diagram illustrating a force sensor assembly in a vehicle.

As shown in FIG. 2, a force sensor assembly according to a first embodiment of the present invention is, for example, applied to a side seat 31 of a vehicle 30. The side seat 31 includes a seat frame 1 (a first support member) and a sliding frame 16. A force sensor 10 is interposed between the seat frame 1 and the sliding frame 16. A force which is detected by the force sensor 10 is transmitted to a control unit 40 as an electrical signal, which is used for controlling inflation of an air bag 41 by the control unit 40.

Figure 1:
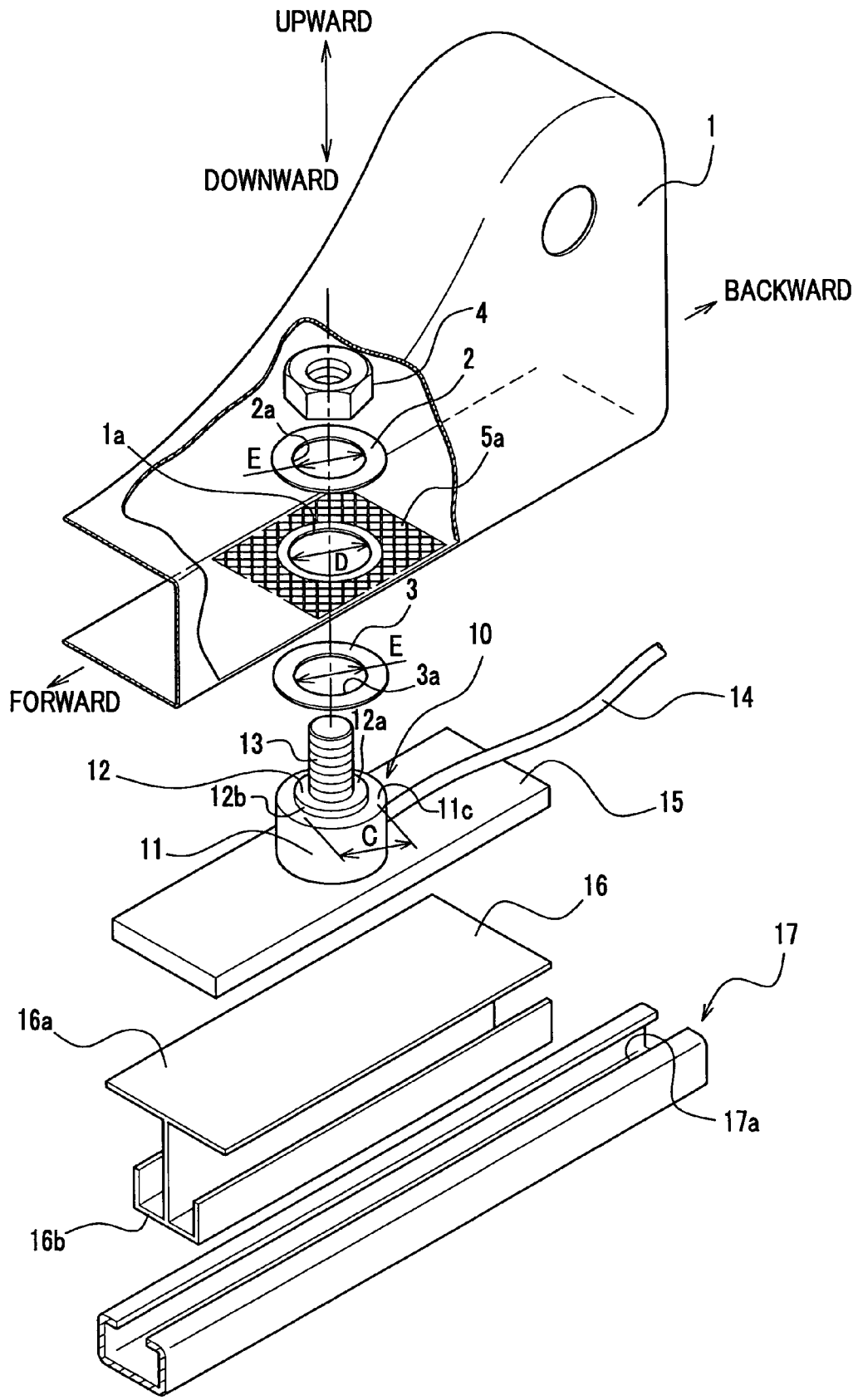
FIG. 1 is an exploded and perspective view showing an example of a force sensor assembly according to the present invention.

As shown in FIG. 1, the sliding frame 16 includes integrally formed two portions, a flange 16a and a sliding portion 16b. The flange 16a, which is shaped like a plate, supports a bracket 15. The sliding portion 16b, which has a substantially T-like shape, is supported by a seat rail 17, which is secured to a floor in a cabin. The seat rail 17 has a guide portion 17a running in forward and backward directions, in which a lower portion of the sliding portion 16b is slidably inserted. In this way, the sliding frame 16 is slidable relative to the seat rail 17 in forward and backward directions, which enables an adjustment of position for the seat 31 in the same directions. It should be noted that shapes of the seat frame 1, sliding frame 16 and seat rail 17, which are shown as examples, do not create limitation.

As shown in FIG. 1, the force sensor 10 includes a housing 11, a restricting member 12, a threaded portion 13 and a cable 14.

Figure 6:
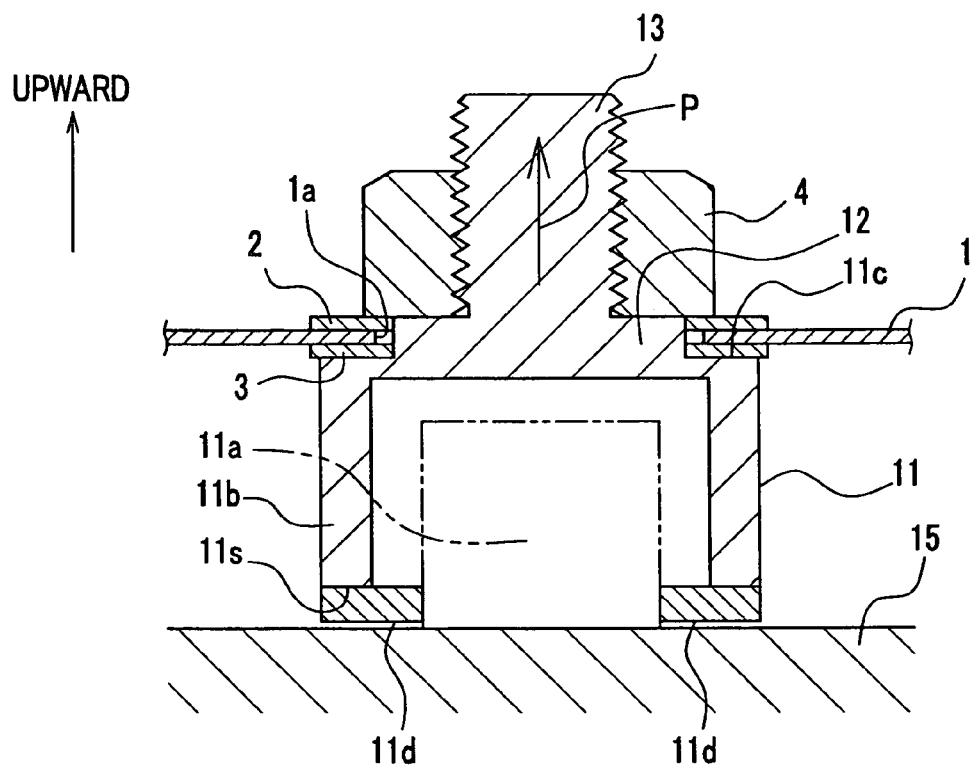
FIG. 6 is a schematic diagram illustrating internal structure of a force sensor.

As shown in FIG. 6, the housing 11 includes a detector 11a and a cylindrical transfer member 11b. A receiving member 11d is attached to the detector 11a circumferentially at its lower end portion. The receiving member 11d is secured to an end portion of the transfer member 11b. For example, the detector 11a has a deforming body, on which a strain gauge is mounted. When a force is exerted downward on the housing 11, a stress induced in the transfer member 11b by the force is transferred to the detector 11a via a junction 11s. As a result, the stress is detected by the strain gauge installed in the detector 11a.

As shown in FIG. 1, the restricting member 12, which is shaped like a disk and disposed between a mounting surface 11c of the housing 11 and the threaded portion 13, is structurally integrated with the housing 11 and the threaded portion 13. The threaded portion 13, which is integrally formed with a bearing surface 12a of the restricting member 12, is directed toward the seat frame 1.

The cable 14 runs from the housing 11 to the control unit 40. A signal of force detected by the housing 11 is transmitted to the control unit 40 through the cable 14.

The seat frame 1 has a cross section of alphabetical C, which is made of metal by bending, a sheet of steel, for example. A through hole 1a is made in a surface of the seat frame 1, which faces the force sensor 10. A dimension (diameter) D of the through hole 1a is adapted to be greater than an external dimension C of the restricting member 12.

Figure 5A:
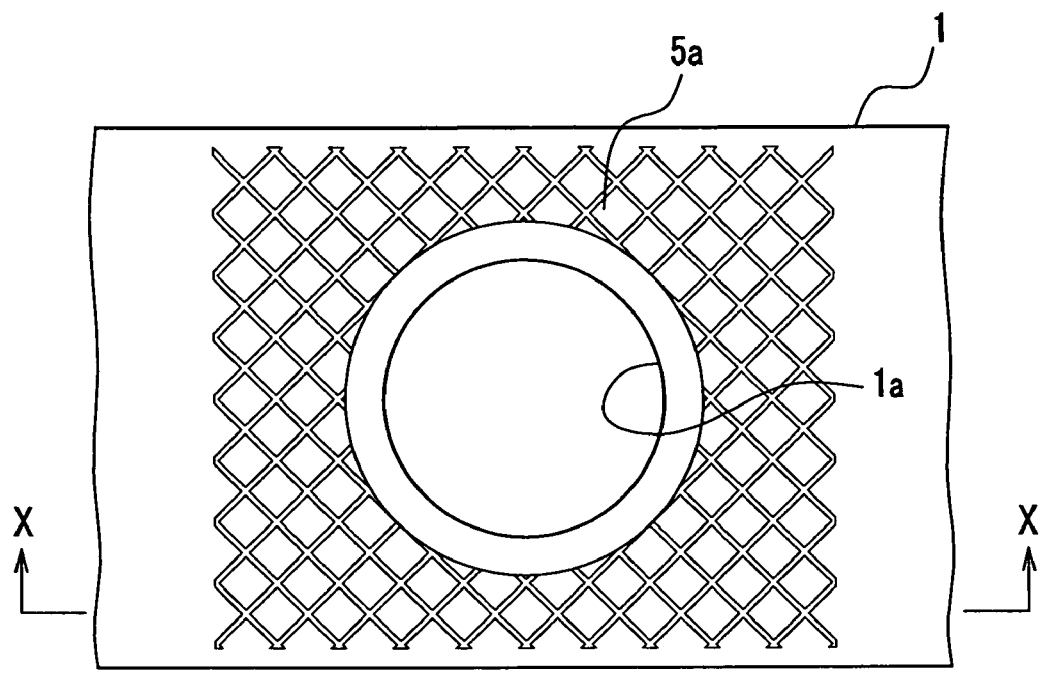
FIG. 5A is a plan view showing an area around a through hole made in a seat frame.
Figure 5B:
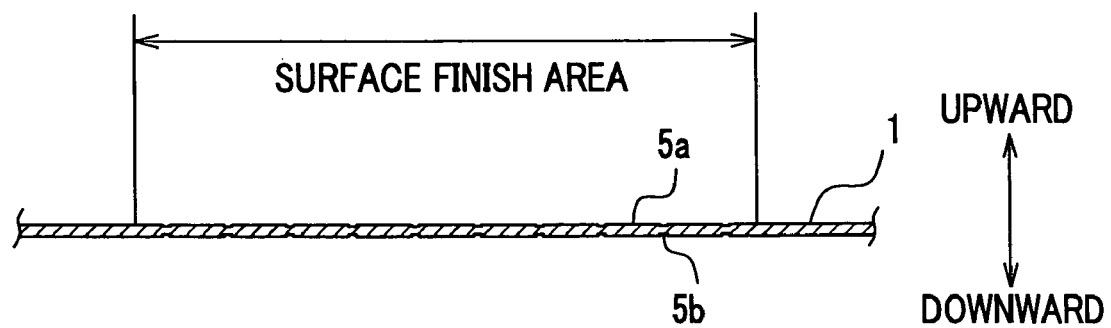
FIG. 5B is a sectional view taken along line X—X shown in FIG. 5A.

As shown in FIG. 5B, areas 5a and 5b with uneven finish are provided on upper and lower surfaces of the seat frame 1. The areas 5a and 5b are symmetrically positioned with respect to the seat frame 1 around the through hole 1a. As shown in FIG. 5A, a quadrilateral, which stays clear of a peripheral area of the through hole 1a is selected for each of the areas 5a and 5b, for example. In this connection, it may be alternatively possible to adopt a cutout instead of the through hole 1a for the seat frame 1.

As shown in FIG. 1, spacers 2 and 3, which are shaped like a ring, are put on upper and lower surfaces of the seat frame 1. The spacers 2 and 3 are made of the same material which is deformable in its thickness direction, and have the same shape. For example, it is possible to select a metallic material, such as copper, brass, aluminum or zinc, or a nonmetallic material which is elastically deformable, such as rubber or plastic. It is preferable but not mandatory that a combination of material is selected for the seat frame 1 and the spacers 2 and 3, such as steel for the seat frame 1 and copper or brass for the spacers 2 and 3. An internal dimension E of the spacers 2 and 3 is adapted to be substantially the same as the external dimension C of the restricting member 12, so that the restricting member 12 can be inserted through holes 2a and 3a of the spacers 2 and 3, respectively.

Figure 3:
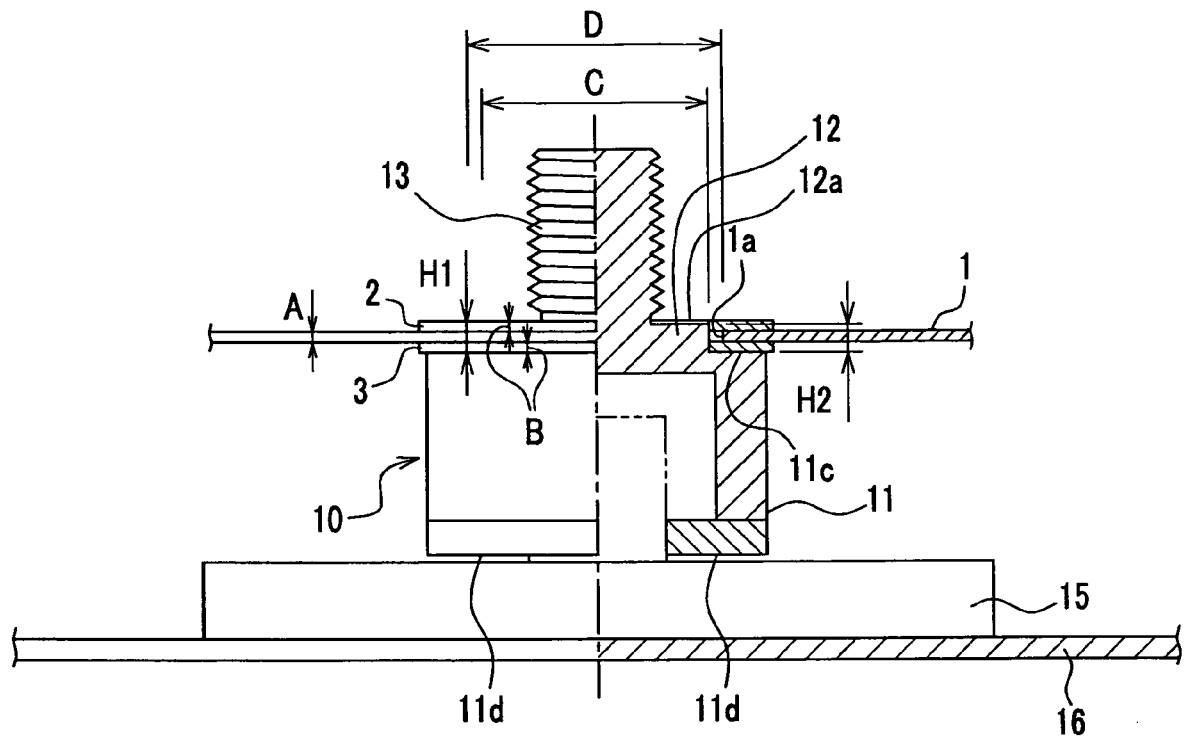
FIG. 3 is a partially sectional view showing a force sensor assembly before a nut is placed.

In the force sensor assembly according to the first embodiment, the threaded portion 13 of the housing 11 is upwardly inserted through the lower spacer 3 while the spacers 2 and 3 are placed on upper and lower surfaces of the seat frame 1, respectively. As shown in FIG. 3, the threaded portion 13 goes through the hole 3a, the through hole 1a and the hole 2a to get exposed over the spacer 2.

As shown in FIG. 3, the opening dimension D of the through hole 1a is adapted to be greater than the external dimension C of the restricting member 12. Accordingly, it is possible for the restricting member 12 not only to go through the through hole 1a, but also to have freedom of movement within the through hole 1a in a direction perpendicular to an axis of the threaded portion 13. In this connection, the internal dimension E of the spacers 2 and 3 (see FIG. 1) is adjusted so that the restricting member 12 is inserted through them with almost no gap. As a result, it is possible to insert the restricting member 12 through the through hole 1a and holes 2a and 3a while the spacers 2 and 3 are put on the seat frame 1.

Assume that the seat frame 1 has a thickness A and the spacers 2 and 3 each have a thickness B. Before a nut 4 is tightened onto the threaded portion 13, a summation of thickness H1 (=A+2B) including the seat frame 1 and the spacers 2 and 3 is adapted to be greater than a height H2 of the restricting member 12. In other words, a height from the mounting surface 11c to an upper surface of the spacer 2 is greater than the height H2.

As shown in FIG. 3, when the nut 4 is tightened onto the threaded portion 13 with a predetermined torque, a lower surface of the nut 4 comes to abut the spacer 2. When the nut 4 is further tightened, the spacers 2 and 3 crush in their thickness direction, the nut 4 strikes the bearing surface 12a of the restricting member 12. At the same time, a summation of thickness H3 (=A+2B1) including the seat frame 1 and the spacers 2 and 3 equals to the height H2 of the restricting member 12. A symbol B1 represents a thickness of each of the crushed spacers 2 and 3.

If no spacers are used, a contact area between the nut 4 and seat frame 1 will decrease when the nut 4 is tightened. As a result, a surface pressure (a force acting on a unit area) acting on the seat frame 1 increases, exerting a locally excessive force on the housing 11, which makes the detection less accurate. The first embodiment, which has the spacers 2 and 3 on the upper and lower surfaces of the seat frame 1, is able to increase contact areas between the spacer 2 and the seat frame 1, and between the spacer 3 and the seat frame 1. This contributes to restricting a surface pressure acting on the housing 11 even if the seat frame 1 does not have complete flatness. In this way, it is possible to prevent a locally excessive force from acting on the housing 11, which enables more accurate detection with a force sensor.

Figure 4:
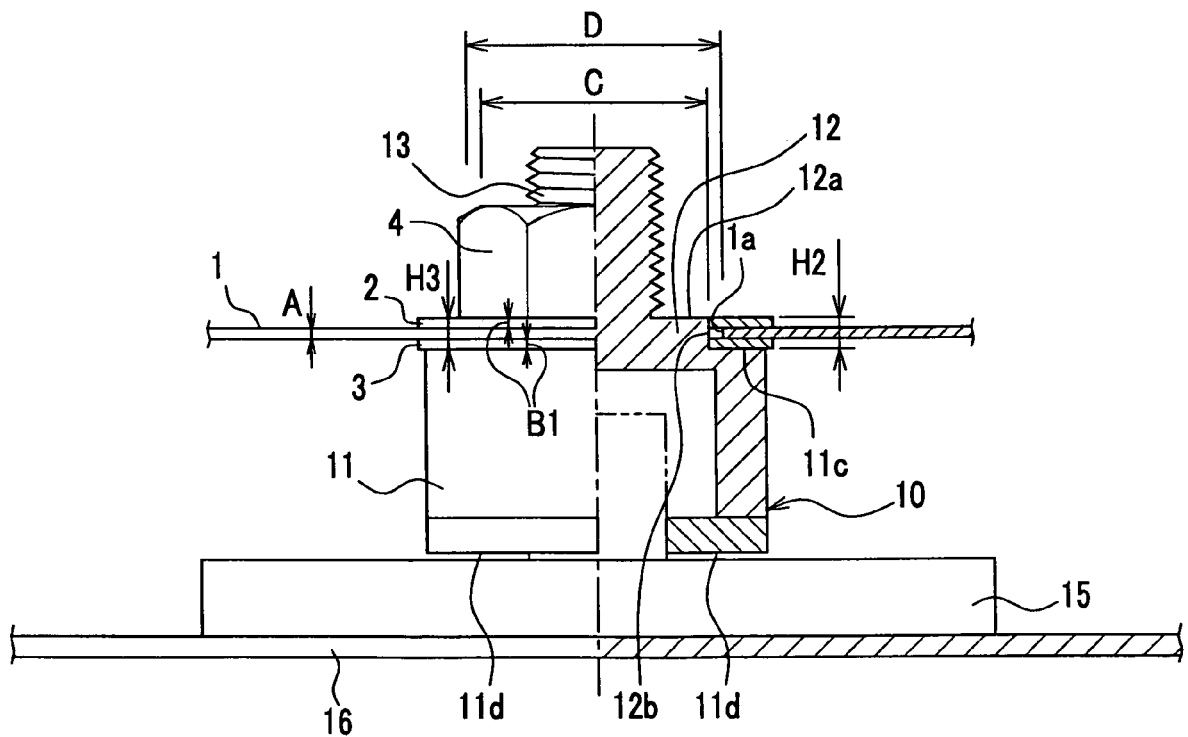
FIG. 4 is a partially sectional view showing a force sensor assembly after a nut is tightened.

As shown in FIG. 4, when the nut 4 has struck the bearing surface 12a of the restricting member 12, the spacers 2 and 3 do not further deform, because a compressive force exerted by the nut 4 does not increase anymore. This means that when the nut 4 has struck the restricting member 12, its rotational movement almost comes to a full stop even if a large torque is exerted on the nut 4. At the same time, frictional forces created in the following locations cease their variations: between the housing 11 and the spacer 3, between the spacer 3 and the seat frame 1, between the nut 4 and the spacer 2, and between the spacer 2 and the seat frame 1. This means that introduction of the restricting member 12 between the housing 11 and the threaded portion 13 allows setting of an upper limit for these frictional forces. Therefore, if the frictional forces described above are adapted to be appropriately small, it is possible to decrease torsion acting on the housing 11 which is induced by a torque about an axis of the threaded portion 13. This will results in more accurate detection.

Furthermore, even if the nut 4 is tightened with an excessive torque, the nut 4 stops at a certain position when it has struck the restricting member 12. Because it is not necessary to provide fine control for a fastening torque, paying much attention to excessive tightening of the nut 4, it is possible to attach the force sensor 10 to the seat frame 1 without looseness.

The first embodiment of the present invention, which has the restricting member 12 integrally formed with the housing 11, increases stiffness of upper portion of the housing 11. Even if a large axial tension induced by excessive tightening of the nut 4 acts on the threaded portion 13, the reinforced housing 11 is less likely to deform. Because it is possible to prevent an excessive force from acting on the housing 11 in tightening the nut 4, an origin of the force sensor 11 is free from a large amount of pre-load. In this way, the first embodiment provides a sufficient range for detecting a force, thereby allowing more accurate detection.

Figure 7:
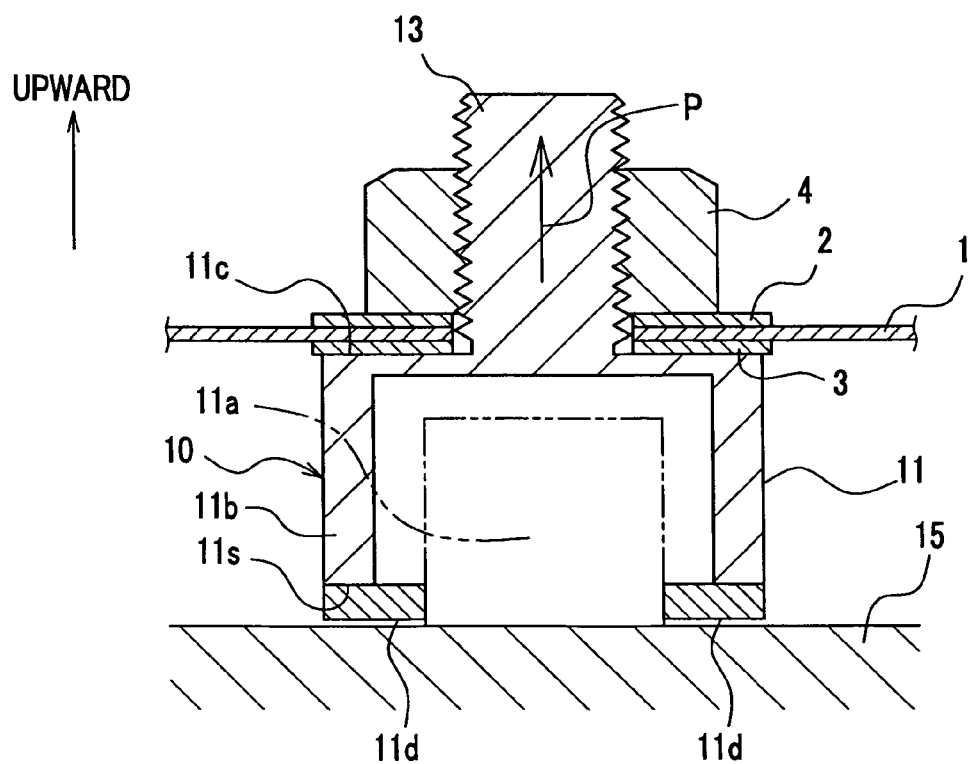
FIG. 7 is a schematic diagram illustrating internal structure of a force sensor without a restricting member.

Description in detail is given of a mechanism how a decrease in accuracy of detection occurs. Suppose that as shown in FIG. 7, a housing 11 does not have a restricting member 12. When an axial force P induced by excessive tightening of a nut 4 acts on a threaded portion 13, a mounting surface 11c of the housing 11 is forced to deform, being pulled upwardly. An origin of force measurement for the housing 11 is shifted because the origin is set under a large amount of force. This will decrease a range of detection available, leading to a decrease in accuracy of detection. Furthermore, if the origin is set under the conditions described above, a secular variation in deformation of the housing 11 shifts the origin of force measurement, thereby deteriorating accuracy of detection of force. The first embodiment of the present invention, which has a restricting member 12 integrally formed with a mounting surface 11c of a housing 11, increases stiffness of an upper portion of the housing 11, thereby making the housing 11 free from deformation caused by an excessive axial force P.

In a force sensor assembly according to the first embodiment, frictional forces, which occur between a spacer 2 and an uneven area 5a as well as between a spacer 3 and an uneven area 5b, absorb a force which is produced in a daily use, such as sliding a seat 31 relative to a seat frame 1. Accordingly, it is possible to prevent displacement between the seat frame 1 and the force sensor 10.

When a force acts on the seat frame 1 to shift it in forward and backward directions, an impact force, for example, this force is absorbed by frictional forces between the uneven area 5a and the spacers 2, and between the uneven area 5b and the spacer 3. In this way, it is possible to prevent an internal periphery of a through hole 1a from abruptly striking a side surface 12b of the restricting member 12. Because damage caused to the force sensor 10 can be avoided, it is possible to eliminate a trouble in which the force sensor 10 fails to work.

In addition, because a dimension D of the through hole 1a is adapted to be greater than an external dimension C of the restricting member 12, it is possible to prevent the through hole 1a from abruptly striking the side surface 12b of the restricting member 12, so that a resulting impact force will be relaxed. In this way, damage caused to the force sensor 10 can be avoided.

b. Second Embodiment

Description is given of a second embodiment of the present invention with reference to the accompanying drawings.

Figure 8:
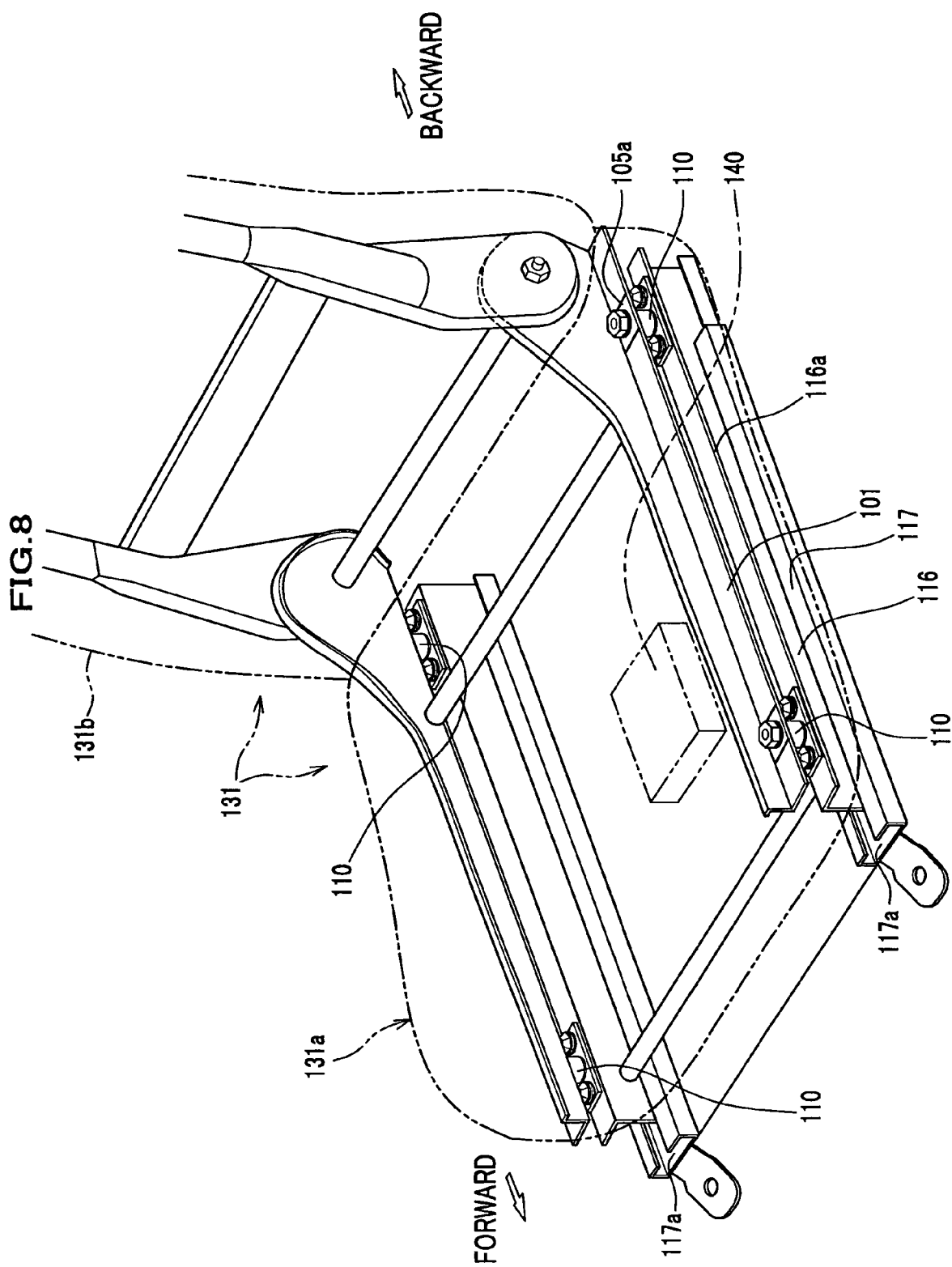
FIG. 8 is a perspective view showing a force sensor assembly according to the present invention.

As shown in FIG. 8, force sensors 110 and a control unit 140 are disposed in a seat 131. When a passenger is seated on the seat 131, four pieces of the force sensors 110, which are mounted between a seat frame 101 and a sliding frame 116 in forward, backward, right and left directions, detect a force acting on the seat 131, which undergoes processing carried out by the control unit 140.

A signal of force detected by a force sensor 110 is used for an air bag device and a seat belt retractor (both not shown) provided for a side seat. The control unit 140 determines whether the passenger seated on the seat 131 is an adult, a child or an infant based on the signal, providing appropriate inflation of an airbag and pretension of a seat belt according to the passenger.

The control unit 140 including a CPU and ROM is mounted on the seat frame 101 under the seat 131. The control unit 140, which is electrically connected to the force sensors 110 by cables (not shown), transmits signals to a control device (not shown) for controlling the air bag device (not shown).

The seat 131 is a side seat, for example, having a seat cushion 131a, on which a passenger is seated. The seat 131 is supported by the seat frame 101 which is made of steel plate and placed under the seat cushion 131a. In this connection, it is alternatively possible to select another seat instead of the side seat as a seat 131.

The seat frame 101, which receives a force resulting from a passenger and the seat 131, includes a parallel pair of pressed members made of steel, which is placed right and left under the seat 131 and extends in forward and backward directions. At a lower end of the seat frame 101 is formed a flange 105, which faces a flange 116a with force sensors 110 interposed between them. The flange 116a is made by bending an upper end portion of the sliding frame 116 like an alphabetical L.

Figure 9:
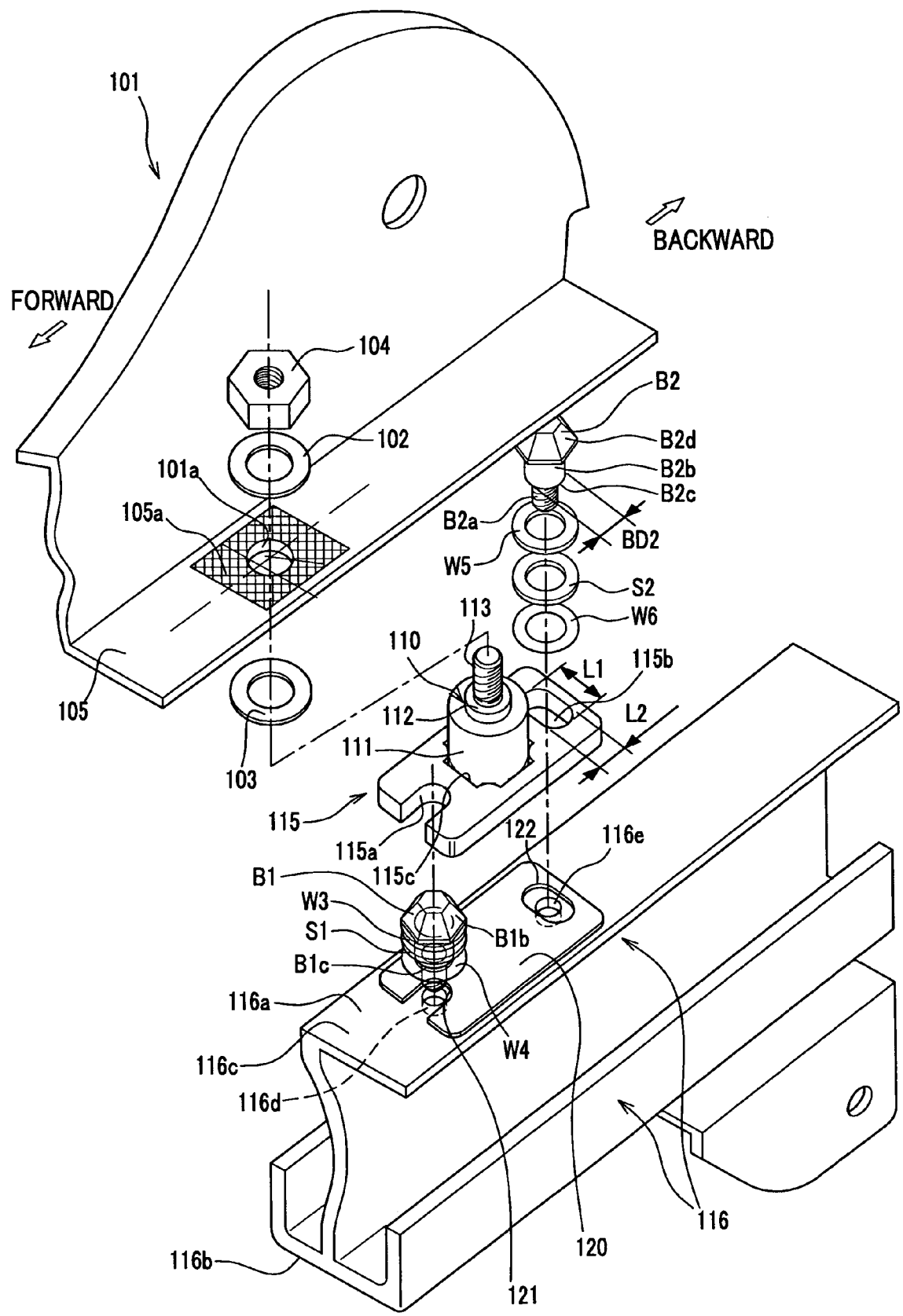
FIG. 9 is an enlarged and exploded perspective view showing a force sensor assembly according to the present invention.

As shown in FIG. 9, the flange 105, which is made by bending a portion of the seat frame 101 like an alphabetical L, has a through hole 101a, through which a disk-like restricting member 112 of the force sensor 110 is inserted so as to secure a force sensor 110. There are uneven areas 105a and 105b on both surfaces of the flange 105 around the through hole 101a (only upper surface shown). The restricting member 112 of the force sensor 110 is upwardly inserted into the through hole 101a with a spacer 103. A nut 104 is screwed onto a threaded portion 113 with a spacer 102. Both spacers 102 and 103 are placed around the restricting member 112. When a force resulting from a passenger, for example, acts on the seat frame 101, a portion of the flange 105 in the periphery of the through hole 101a exerts a compressive force on the force sensor 110 via the spacer 103.

As shown in FIG. 8, the sliding frame 116, which is slidable in forward and backward directions with the seat cushion 131a and a seat back 131b, is secured to the flange 105, while the force sensor 110 is interposed between the sliding frame 116 and the flange 105. The sliding frame 116, which is made of steel by pressing, has a sliding portion 116b at its lower end portion, which is slidably engaged with a guide portion 117a of a seat rail 117.

As shown in FIG. 9, on an upper surface of the flange 116a there is a mounting surface 116c which is provided for mounting a force sensor 110. Through holes 116d and 116e are made in the mounting surface 116c, through which threaded portions B1a and B2a are inserted. Nuts N1 and N2 are secured to peripheries of the through holes 116d and 116e on a lower surface of the flange 116a (see FIG. 10).

The through hole 116d, which is positioned forward, is used as a reference hole in mounting the force sensor 110 on the sliding frame 116. The through holes 116d and 116e are circular holes, through which the threaded portions B1a (see FIG. 10) and the B2a (se FIG. 12) are inserted, respectively. The through holes 116d and 116e are so adjusted that step portions B1c and B2c abut the mounting surface 116c, when the threaded portion B1a and B2a are screwed into the nuts N1 and N2, respectively.

The sliding frame 116 corresponds to a second support member and a lower structural member disposed under a cushion of the seat referred to in the appended claims.

The sliding member 120, which smoothly slides a bracket 115 between the mounting surface 116c and washers W4, W6 provided for the bolt B1 and B2, respectively. The sliding member 120 is made of a metallic plate with small roughness or a plate of oleo-resin, for example. The sliding member 120 is adapted to be the same size as the bracket 115. The sliding member 120 has a cutout 121 and an oblong sliding hole 122. A major portion B1b of the bolt B1 is inserted through a cutout 116a of the bracket 115 and the cutout 121. Similarly, a major portion B2b of the bolt B2 is inserted through a sliding hole 115b of the bracket 115 and the sliding hole 122.

The sliding member 120 is different from a typical washer for preventing loosening of a bolt and nut. It is a member for allowing the bracket 115 to slightly move, which is interposed between the mounting surface 116c and a head B1d of the bolt B1 as well as a head B2d of the bolt B2, so as to decrease an adverse effect on the force sensor 110, when an impact force acts on the bracket 115. It may be alternatively possible to select a circular hole for the sliding hole 122 so long as its diameter is sufficiently greater than a diameter BD2 of the major portion B2b.

The force sensor 110 is the same as the force sensor 10 according to the first embodiment. The housing 111, restricting member 112 and threaded portion 113 are comparable to the housing 11, restricting member 12 and threaded portion 13, respectively.

An end portion of the housing 111 is rested within a recess 115c and a deforming body is secured to the bracket 115 by laser welding, for example. On an upper surface of the housing 111, the threaded portion 113 and the restricting member 112 are formed. An upper portion of the housing 111 is secured to the seat frame 101 by screwing the nut 104 onto the threaded portion 113 after inserting the restricting member 112 through the spacer 103, the flange 105 and the spacer 102.

As shown in FIG. 9, the bracket 115, which is for securing the force sensor 110 to the sliding frame 116, is made of a steel plate that has the cutout 115a and sliding hole 115b, through which the bolts B1 and B2 are inserted, respectively. The cutout 116a is positioned forward and unclosed at a forward end of the bracket 115. The sliding hole 115b, which is adapted to be oblong in a direction of vehicle width, is positioned backward (oppositely). The recess 115c is formed in a middle of the bracket 115, in which the force sensor 110 is rested. The bracket 115 is able to move along the mounting surface 116c. The sliding member 120 is interposed between the mounting surface 116c and the bracket 115.

The cutout 115a not only allows the bracket 115 to be inserted from backward relative to the bolt B1, but also provides fine adjustment for its positioning.

The sliding hole 115b is provided for positioning the bracket 115 properly. So is the sliding hole 122 of the sliding member 121. A dimension L1 in a right-left direction and a dimension L2 in a forward-backward direction, which are applied to both sliding holes 115b and 122, are adapted to be greater than the diameter BD2 of the major portion B2b of the bolt B2 by 2 to 10 mm. In this way, it is possible to adjust positions for the bracket 115 and the sliding member 120.

The bolt B1 is a hexagonal head bolt, which includes the threaded portion B1a, major portion B1b, step portion B1c (see FIG. 10) and head B1d. Similarly, the bolt B2 is a hexagonal head bolt, which includes the threaded portion B2a, major portion B2b, step portion B2c (see FIG. 12) and head B2d.

While the bracket 115 is positioned so as to face the mounting surface 116c, the bolt B1 is screwed into the nut N1 after the major portion B1b has been inserted through a washer W3, spacer S1, washer W4, cutout 115a and cutout 121 and the threaded portion B1a has been inserted through the through hole 116d. Similarly, the bolt B2 is screwed into the nut N2.

Figure 10:
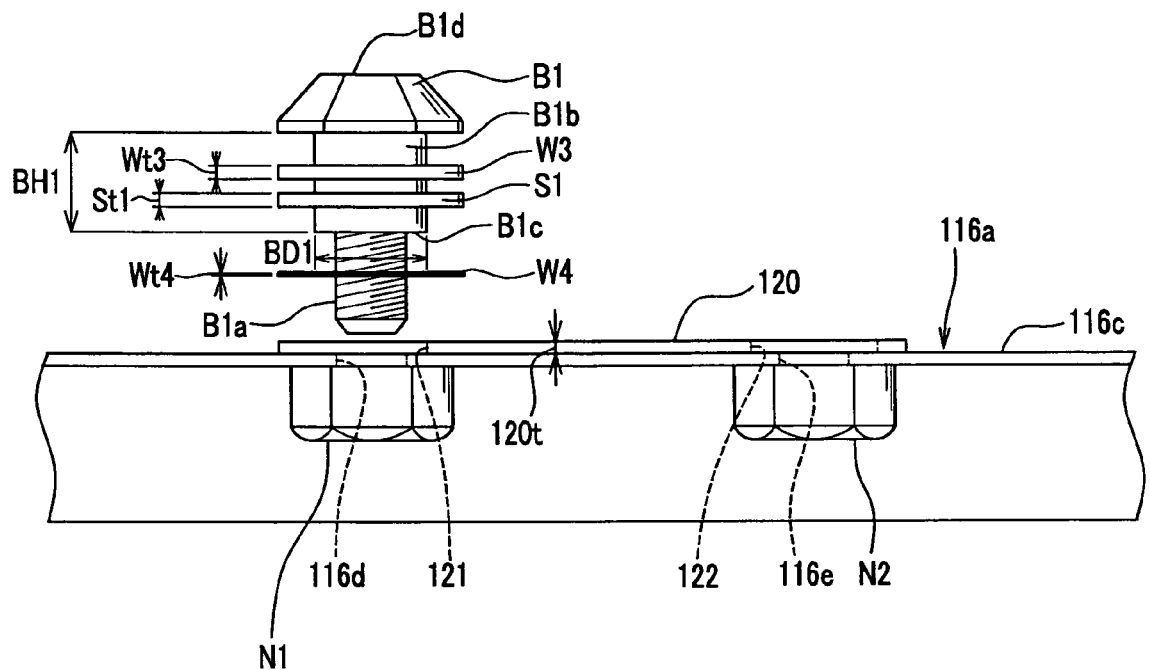
FIG. 10 is an enlarged side view showing a bolt while temporarily fastened with a sliding frame.

As shown in FIG. 10, the threaded portion B1a, whose major diameter is smaller than the major portion B1b, is screwed into the nut N1.

The major portion B1b is a cylindrical portion without threads extending from an end of the threaded portion B1a to the head B1d via the step portion B1c.

The step portion B1c, which is formed between the threaded portion B1a and the major portion B1b, abuts the mounting surface 116c. A height of the step portion B1c is so adjusted that when the threaded portion B1a is screwed into the nut N1 and the step portion B1c abuts the mounting surface 116c, the head B1d maintains a clearance from the bracket 115.

The head B1d is hexagonal and formed at an upper end of the major portion B1b. The spacer S1, which provides a compressive force for the bracket 115 against the sliding frame 116, is interposed between the head B1d and the bracket 115.

Because a combination of the bolt B2 and nut N2 is almost the same as that of the bolt B1 and nut N1, description will not be repeated for the bolt B2 and nut N2.

In this connection, the bolts B1 and B2 and the nuts N1 and N2 correspond to fasteners in the appended claims.

The nut N1, which is an hexagonal nut to be screwed onto the threaded portion B1a of bolt B1 and aligned with the through hole 116d, is secured to a lower surface of the flange 116a, opposite to the mounting surface 116c, by welding for example. Because the nut N2 is almost the same as the nut N1, description will not be repeated for the nut N2.

As shown in FIG. 9, each of the washers W3 and W5 is a flat washer of ring-shape made of metal. The washer W4 is a thin washer of ring-shape made of plastic or metal, which has uniform elasticity. The washer W4, with which the bolt B1 is screwed into the nut N1, exerts a compressive force on an upper surface around the cutout 115a. Similarly, the washer W6 is a thin washer of ring-shape made of plastic or metal, which has uniform elasticity. The washer W6, with which the bolt B2 is screwed into the nut N2, exerts a compressive force on an upper surface around the sliding hole 115b.

Each of the spacers S1 and S2 is an elastic spring washer or a ring-like member made of elastic material like rubber. The major portion B1b is inserted through the spacer S1 interposed between the washers W3 and W4. Similarly, the major portion B2b is inserted through the spacer S2 interposed between the washers W5 and W6.

Figure 12:
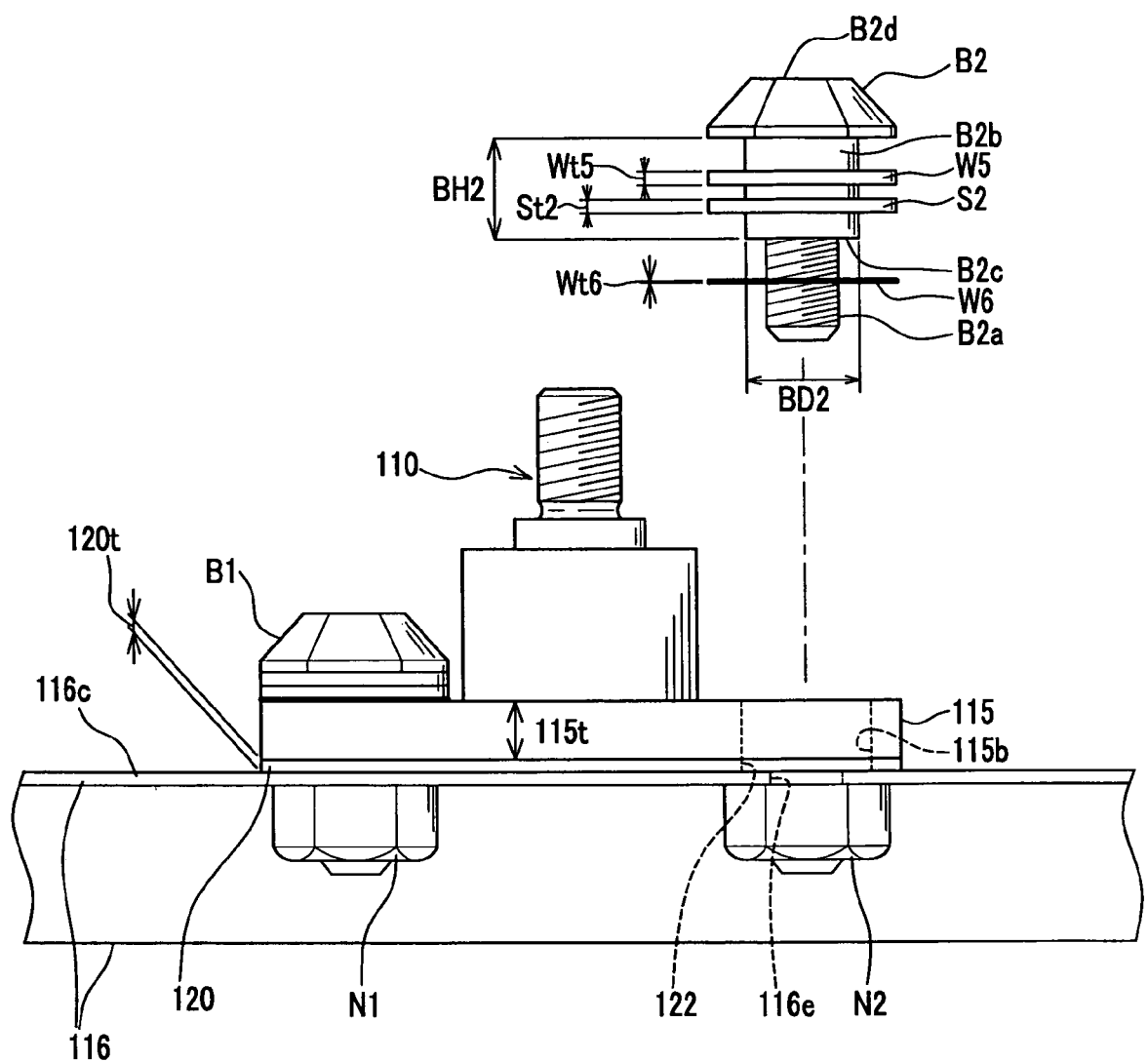
FIG. 12 is an enlarged side view showing a bracket while engaged with a bolt.

As shown in FIGS. 10 and 12, a height BH1 of the major portion B1b is not greater than a summation SH1, which adds up a thickness 115t of the bracket 115, a thickness 120t of the sliding member 120, a thickness Wt3 of the washer W3, a thickness Wt4 of the washer W4 and a thickness St1 of the spacer S1. Also, the height BH1 is greater than a summation of the thickness 120t and thickness 115t. These relationships are shown in the following expression:

$$SH1 = 120t + Wt3 + Wt4 + St1 + 115t \geq BH1 > 120t + 115t$$

As shown in FIG. 12, a height BH2 of the major portion B2b satisfies the following expression, similarly:

$$SH2 = 120t + Wt5 + Wt6 + St2 + 115t \geq BH2 > 120t + 115t$$

where BH2 represents a height of the major portion B2b, and SH2 represents a summation including the thickness 115t of bracket 115, the thickness 120t of sliding member 120, a thickness Wt5 of the washer W5, a thickness Wt6 of the washer W6 and a thickness St2 of the spacer S2.

When the bolt B1 is screwed into the nut N1 and the step portion B1c has struck the mounting surface 116c, the spacer S1 elastically deforms, so that the summation SH1 becomes equal to the height BH1. The similar explanation is true of the bolt B2 and the nut N2. In this way, compressive forces exerted by the spacers S1 and S2 prevent the bracket 115 from loosening. Even if the sliding member 120 is worn or deformed due to degradation to vary its thickness, it is possible to provide a stable compressive force to the bracket 115.

In this connection, the spacers S1 and S2 correspond to an elastic member in the appended claims.

Next, description is given of steps applied to a force sensor assembly while it is mounted according to the present invention with reference to FIGS. 8–14.

As shown in FIG. 8, four pieces of force sensors 110 are mounted onto a seat frame 101.

As shown in FIG. 9, a nut 104 is tightened onto a threaded portion 103 of a force sensor 110, which has been inserted through a spacer 103, a through hole 101a of the seat frame 101 and a spacer 102.

As shown in FIG. 10, a bolt B1 is inserted through a washer W3, a spacer S1 and a washer W4. A threaded portion B1a, which has been inserted through a through hole 116d of a sliding frame 116, is temporarily screwed into a nut N1. In this way, the nut N1 provides a reference position for mounting the force sensor 110 (see FIG. 11). Only one or two bolts B1 are temporarily fastened.

Figure 11:
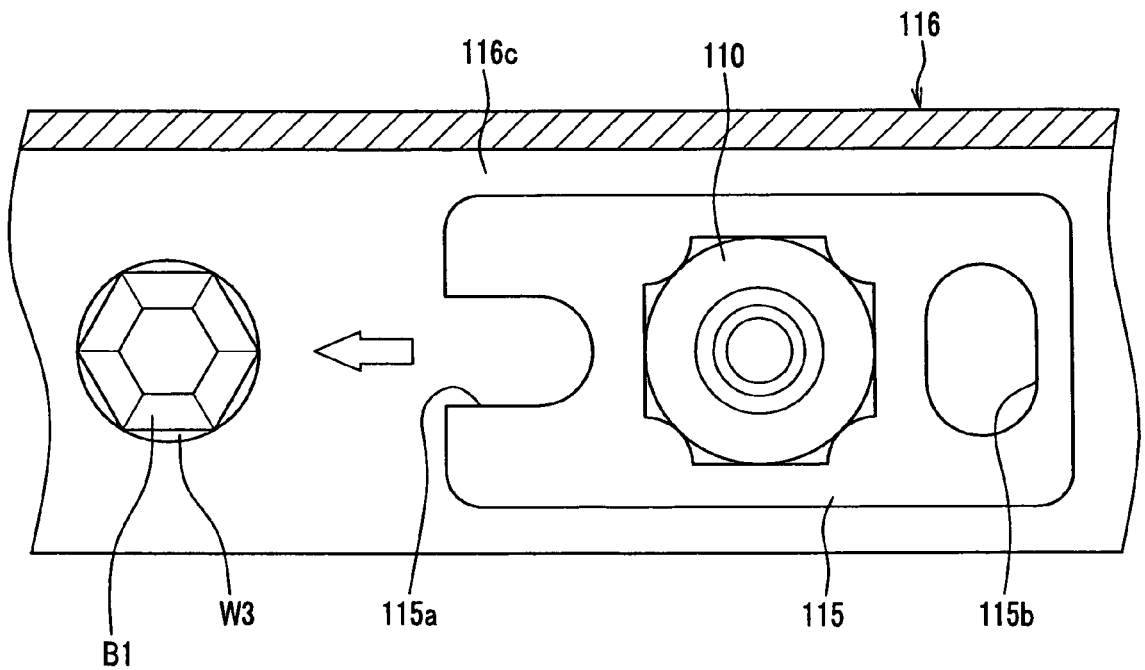
FIG. 11 is an enlarged plan view showing a cutout of bracket while engaged with a bolt.

As shown in FIG. 11, a bracket 115 on top of a sliding member 120 is inserted between the washer W4 (see FIG. 10) and a mounting surface 116c so that its cutout 115a is engaged with a major portion B1b of the bolt B1. Because the washer W4 and the sliding member 120 are made of sliding material or have surface treatment, it is possible to smoothly engage the bracket 115 with the bolt B1.

Next, remaining bolts B1, each of which has been inserted through a washer W3, a spacer S1 and a washer W4, are temporarily screwed into nuts N1. Bolts B2 are temporarily screwed into nuts N2 one by one, which are attached to four positions of the sliding frame 116. As shown in FIG. 12, each bolt B2 is inserted through a washer W5, a spacer S2 and a washer W6. Its threaded portion B2a, which has been inserted through a sliding hole 115b of the bracket 115, a sliding hole 122 of the sliding member 120 and a through hole 116e of the slide frame 116, is temporarily screwed into a nut N2.

Figure 13:
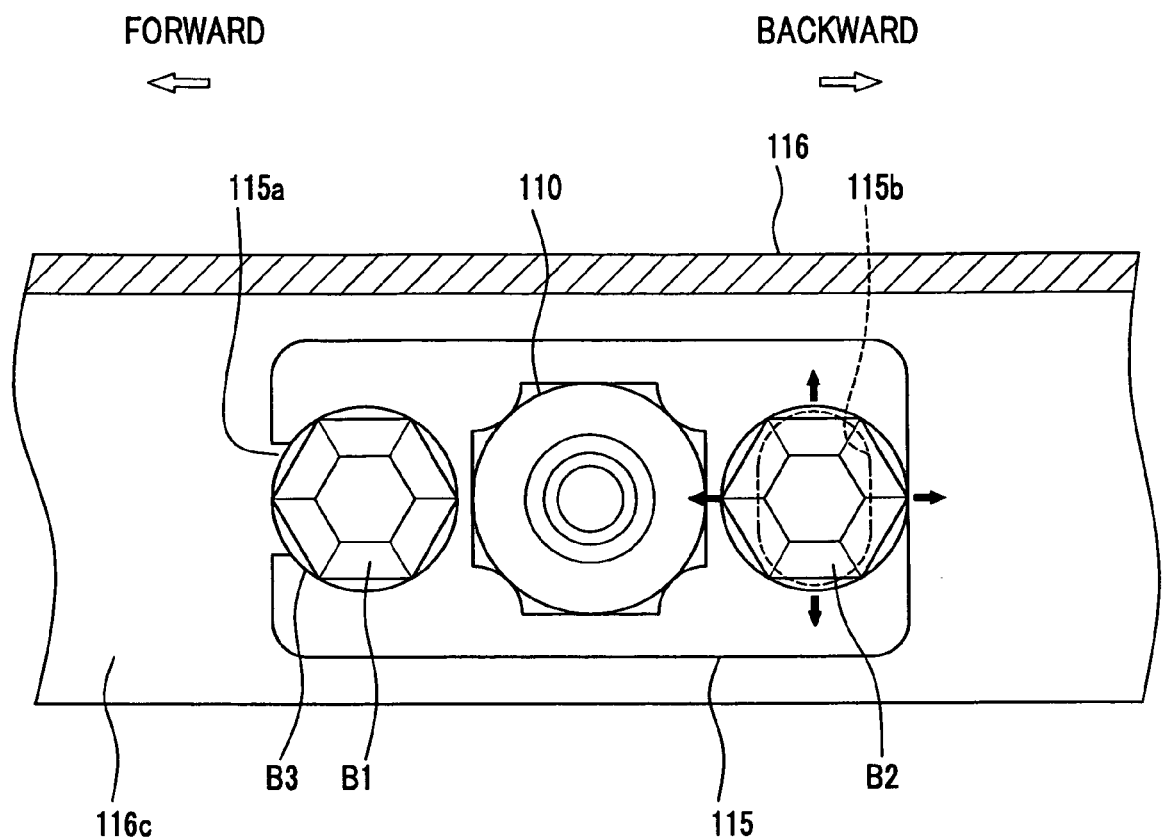
FIG. 13 is an enlarged plan view showing adjustment for location of a force sensor.

As shown in FIG. 13, a position of a force sensor 110 is adjusted by shifting a sliding hole 115b (see FIG. 11) in right, left, forward and backward directions (shown by arrows in FIG. 13) relative to a bolt B1 as reference. A bolt B2 is inserted in a sliding hole 115b, whose dimension is greater than a diameter BD2 of a major portion B2b. In addition, the bolt B1 is engaged with a cutout 115a. As a result, it is possible to make fine adjustment for the force sensor 110 and bracket 115 in forward and backward directions (see FIG. 9).

Figure 14:
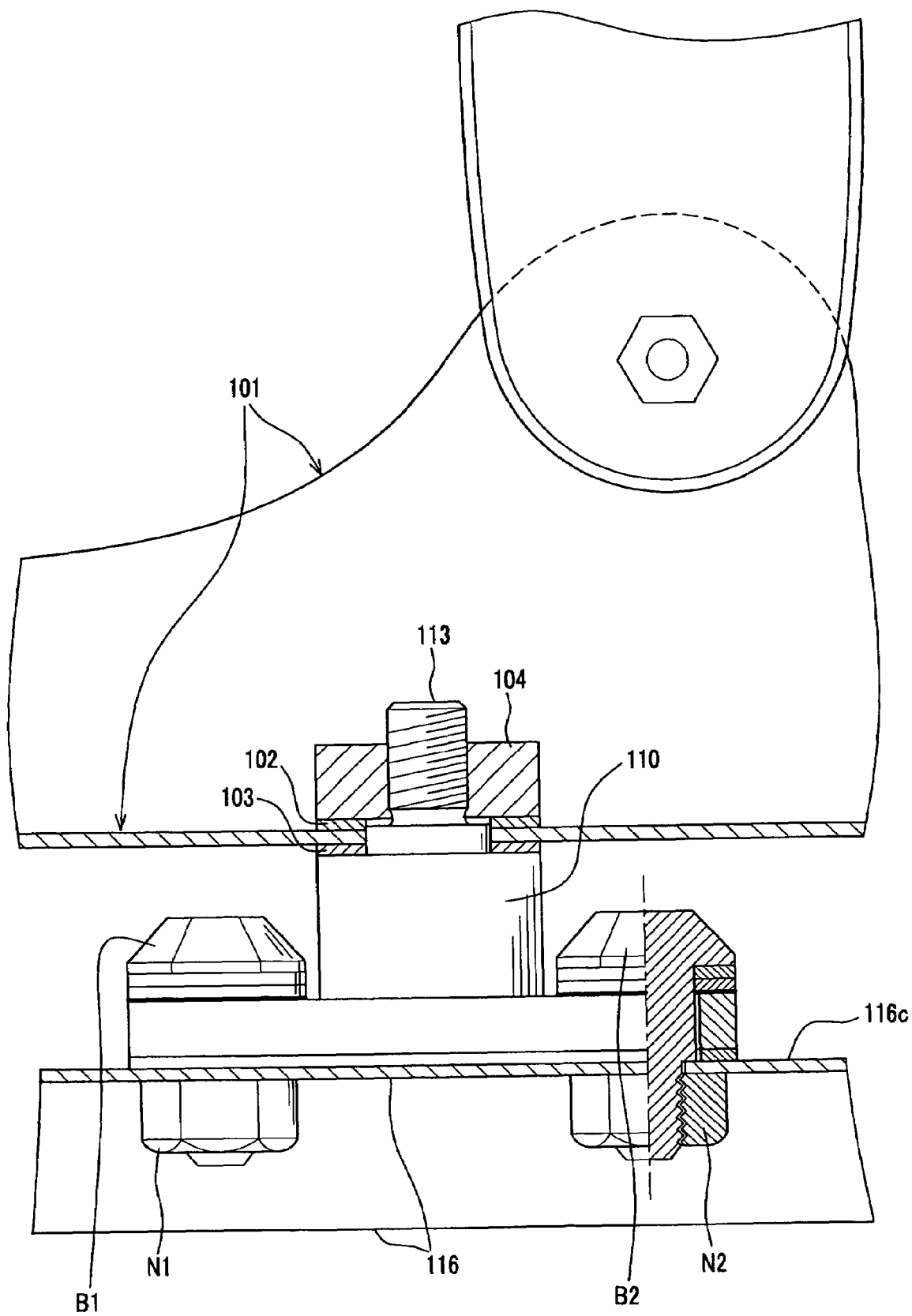
FIG. 14 is an enlarged side view showing a force sensor mounted on a seat.

As shown in FIG. 14, when positioning of the force sensor 110 has been completed, the bolts B1 and B2 are tightened. In this way, mounting of the force sensor 110 is completed.

A flange 105 of a seat frame 101 and a flange 116a of a sliding frame 116, which confront each other interposing a force sensor 110, are designed to be parallel. However, when their parallelism is poor due to an error associated with manufacturing, the flanges 105 and 116a deform to return as bolts B1 and B2 are fastened more tightly. This will produce a force acting on the force sensor 110, decreasing accuracy for its measurement of force. A force is also imposed on a force sensor 110 in various occasions, such as when a seat rail 117 is mounted onto a vehicle after a seat frame 101, force sensors 110 and a sliding frame 116 have been assembled, and when the sliding frame 116 is slid relative to the seat rail 117, for example.

In the second embodiment of the present invention, it is possible to slide the force sensor 110 by a sliding member 120 relative to the sliding frame 116. This makes the force sensor 110 move to absorb a force produced by deformation of the flanges 105 and 116a, which is caused by fastening bolts B1 and B2 too tightly.

As shown in FIG. 8, when a passenger is seated on a seat 131, his weight acts on the force sensor 110 via the seat frame 101. Resulting tensile and compressive forces acting on a strain gauge installed in the force sensor 110 result in a variation of electric resistance of the strain gauge. It is possible to measure the weight of passenger by detecting the electric resistance.

A control unit 140 is able to categorize the passenger according to weight obtained from the detected electric resistance (or output signal generated from the detected electric resistance). For example, it may be possible to categorize the passenger into an infant, child, adult woman or adult man according to weight, which makes possible controlling a position of seat belt and amount of inflation of an air bag so as to work desirably for the passenger.

When an impact force acts on a seat 131, it is possible to prevent a force sensor 110 from suffering damage. The reason for this is that a bracket 115 moves to absorb the impact force. This is facilitated by not only a sliding member 120 that is interposed between the bracket 115 and a mounting surface 116c, but also the fact that a cutout 115a and a sliding hole 115b of the bracket 115 have dimensions greater than diameters BD1 and BD2 of bolts B1 and B2, respectively.

c. Third Embodiment

A force sensor is not necessarily mounted between a seat frame and a sliding frame. It may be alternatively possible that the force sensor is placed between a member, which receives a force including a passenger and a seat, and a lower structural member disposed under a cushion of the seat. For example, it may be possible to place the force sensor between the seat and a floor panel (see FIG. 15).

Figure 15:
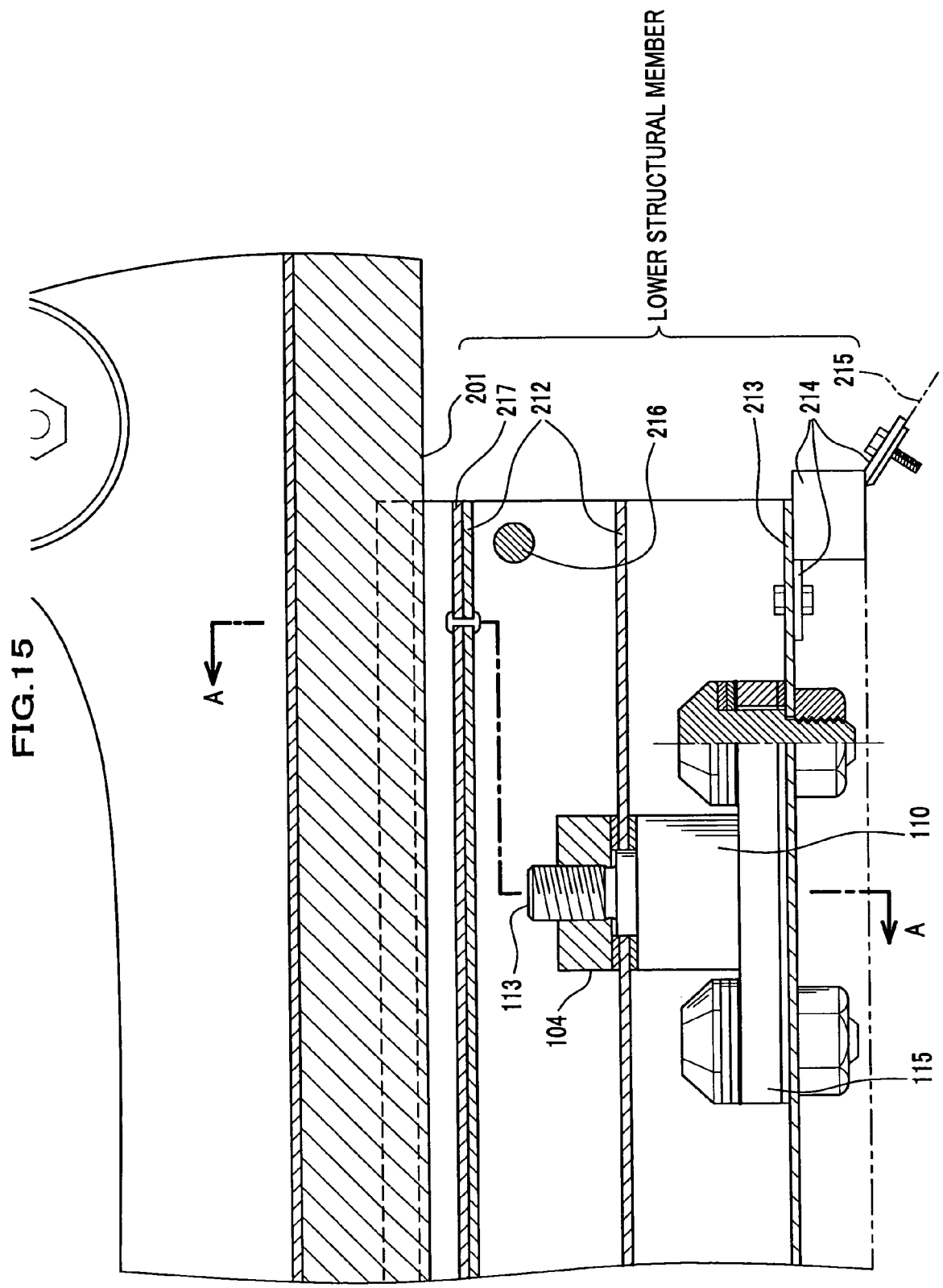
FIG. 15 is a side view showing a force sensor in a mounted configuration.
Figure 16:
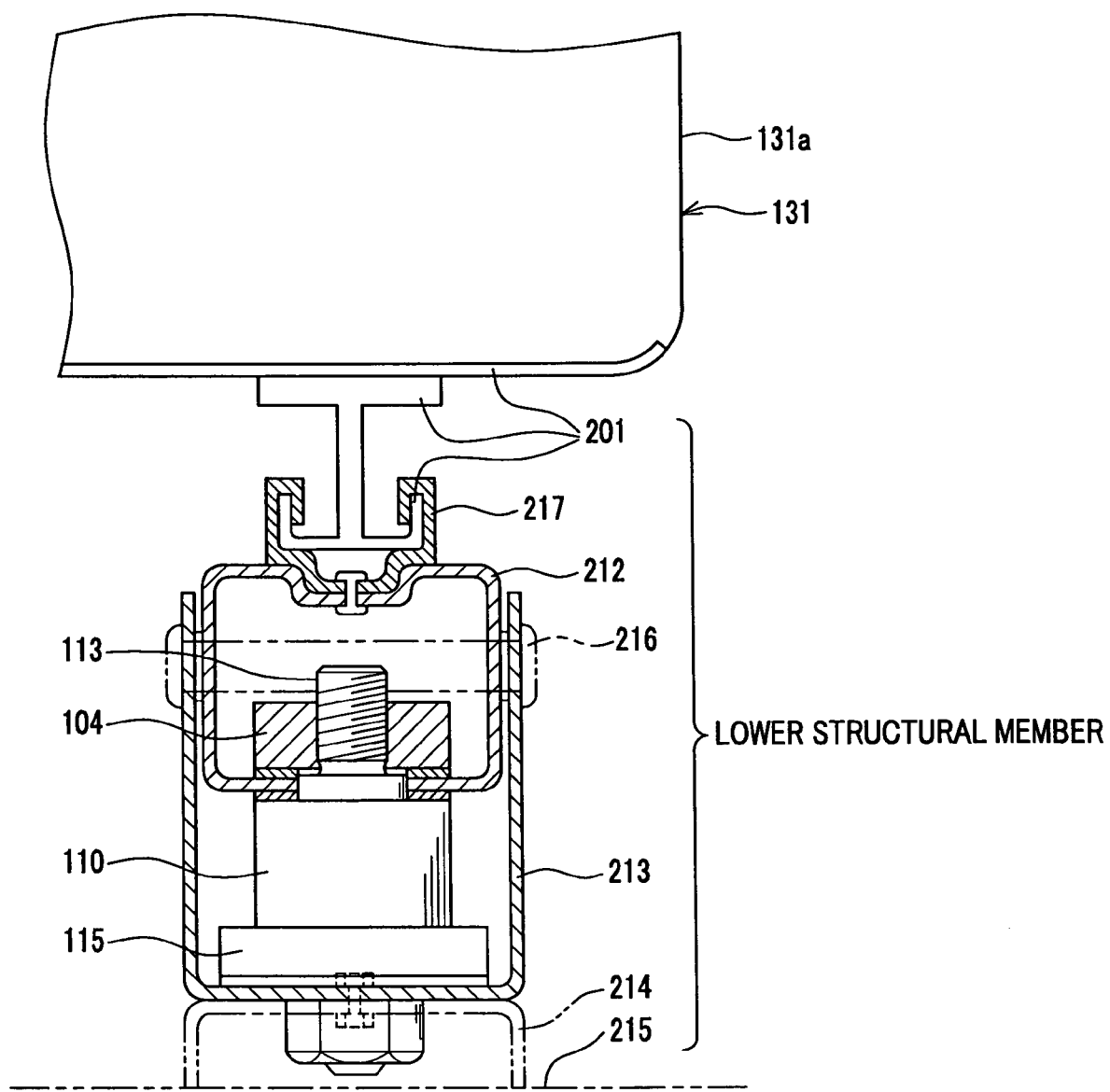
FIG. 16 is a sectional view taken along line A—A in FIG. 15.

A lower structural member disposed under a cushion of a seat, which is placed under a seat cushion 131a, is comparable to a seat frame 101, a sliding frame 116, a seat rail 117 as shown in FIG. 8, or a seat frame 201, a seat rail 217, a rail support member 212, a base frame 213 a seat bracket 214 and a floor panel 215 as shown in FIGS. 15 and 16.

As shown in FIGS. 15 and 16, a bracket 115 of a force sensor 110 is secured to the base frame 213, which is secured to the seat bracket 214 of the floor panel 215. A nut 104 is tightened onto a threaded portion 113 so as to secure the force sensor 110 to the rail support member 212, which is supported by the base frame 213 with a pin 216. The rail support member 212 is attached to the base frame 213 so as to receive a force resulting from a seat 131 and a passenger seated on it through the seat frame 201 and the seat rail 217.

In this way, it is possible for the force sensor 110 not only to detect weight of the passenger, but also to be mounted properly with adjustment resulting from introduction of a cutout 115a and a sliding hole 115b of the bracket 115 (see FIG. 9).

While the invention has been described in detail and with reference to specific embodiments thereof, it will be apparent to one skilled in the art that various changes and modifications can be made therein without departing from the spirit and scope thereof.

For example, it may be alternatively possible to adopt a spring washer instead of a spacer, which is used for mounting a force sensor on a flange of a seat frame. In this case, even if dimensions H1 and H2 are selected to be the same, it is possible to achieve the same advantages that are brought by the embodiments described above. This is ascribed to the fact that the spring washer is able to generate appropriate frictions by its elastic force at interfaces between a nut, spring washer, seat frame and housing of the force sensor, when the nut is tightened onto the threaded portion to strike a restricting member.

The present invention is not limited to a force sensor provided for a side seat. It may be possible to mount a force sensor on a driver's seat or a rear seat to detect weight of a driver or passenger seated on it.

A force sensor is not limited to a type which detects force according to variation in electric resistance of a gauge due to distortion. It may be possible to adopt another type of force sensor as long as it is capable of detecting weight for a passenger seated on a seat. For example, it may be possible to use a sensor which detects pressure generated by a passenger when he is seated.

Foreign priority documents, JP 2004-208009 filed on Jul. 15, 2004 and JP2004-208010 filed on Jul. 15, 2004, are hereby incorporated by reference.

What is claimed is:

1. A force sensor assembly comprising:
 a force sensor;
 a first support member;
 a threaded portion provided for the force sensor;
 an opening made in the first support member;
 a nut screwed onto the threaded portion which is inserted through the opening;
 a restricting member provided between the force sensor and the nut; and
 a spacer, which is deformable in a direction of thickness thereof, provided between the force sensor and the nut, a shape of the spacer being adapted to avoid interference with the restricting member;
 wherein before the nut is tightened onto the threaded portion, a summation of thickness for the first support member and the spacer is adapted to be not less than a height of the restricting member, and the nut is tightened up with a predetermined fastening torque until the spacer deforms so that the nut strikes the restricting member.

2. A force sensor assembly according to claim 1, wherein the restricting member is integrally formed with the force sensor.

3. A force sensor assembly according to claim 1, wherein the restricting member is positioned within the opening and an internal dimension of the opening is greater than an external dimension of the restricting member.

4. A force sensor assembly according to claim 1, wherein the first support member has an area which prevents slip for the spacer 5. A force sensor assembly according to claim 4, wherein the first support member and the spacer are made of metal and the spacer is softer than the first support member.

6. A force sensor assembly according to claim 1, wherein the first support member comprises a seat frame.

7. A force sensor assembly according to claim 1, further comprising:
   a second support member;
   a bracket;
   fasteners for attaching the force sensor to the second support member through the bracket; and
   a sliding member;
   wherein the bracket is able to slide on the second support member and the sliding member is interposed between the second support member and the bracket.

8. A force sensor assembly according to claim 7, wherein the bracket has a sliding hole through which a first fastener is inserted and a dimension of the sliding hole is adapted to be 2 to 10 mm greater than an external diameter of the first fastener.

9. A force sensor assembly according to claim 8, wherein the bracket further has a cutout through which a second fastener is inserted, the cutout has an unclosed portion at one end portion of the bracket and the sliding hole is positioned an opposite side of the bracket relative to the cutout.

10. A force sensor assembly according to claim 9, wherein the sliding member comprises a plastic plate having a sliding hole through which the first fastener is inserted and a cutout through which the second fastener is inserted.

11. A force sensor assembly according to claim 8, further comprising an elastic member,
   wherein the first fastener comprises a bolt inserted through the sliding hole and a nut screwed onto the bolt to interpose the second support member,
   wherein a through hole is made in the second support member and the bolt is inserted through the through hole and the sliding hole of the bracket,
   wherein the bolt comprises a threaded portion screwed into the nut, a step portion, a major portion, which extends from the step portion, having a diameter greater than the threaded portion, and a head portion formed at an end of the major portion,
   wherein the through hole is positioned so that the step portion abuts the second support member when the bolt is screwed into the nut,
   wherein a height of the step portion is adapted so that the head portion stays away from the bracket when the step portion abuts on the second support member, and
   wherein the elastic member is interposed between the head portion and the bracket so as to produce a force pressing the bracket against the second support member.

12. A force sensor assembly according to claim 7, wherein the force sensor comprises a sensor which weighs a passenger seated on a seat of a vehicle, and the second support member comprises a lower structural member disposed under a cushion of the seat.

13. A force sensor assembly according to claim 12, wherein the force sensor is positioned in a center of the bracket,
   wherein a cutout having an unclosed portion in a forward—backward direction of the vehicle is made in the bracket, and
   wherein a sliding hole which is oblong in a width direction of the vehicle is made in the bracket on an opposite side of the cutout relative to the force sensor.

* * * * *